July 2, 1957 — F. M. McCORD — 2,797,525
FISHERMAN'S TACKLE AND BAIT CARRIER
Filed April 21, 1955 — 2 Sheets-Sheet 1

INVENTOR
Fred M. McCord
By Herbert A. Minturn,
ATTORNEY

July 2, 1957  F. M. McCORD  2,797,525
FISHERMAN'S TACKLE AND BAIT CARRIER
Filed April 21, 1955  2 Sheets-Sheet 2

INVENTOR
Fred M. McCord
By Herbert A. Venturn
ATTORNEY

United States Patent Office 2,797,525
Patented July 2, 1957

2,797,525

FISHERMAN'S TACKLE AND BAIT CARRIER

Fred M. McCord, Frankton, Ind.

Application April 21, 1955, Serial No. 502,770

3 Claims. (Cl. 43—55)

This invention relates to a construction for carrying a tackle box, a minnow bucket or the like, and other fishing equipment such as poles, bait can etc.

The invention is embodied in a construction whereby there is a bait box serving as a seat supported by a number of legs between and under the box carrying a container such as a minnow bucket all in a secure manner and yet readily available for use.

The important object of the invention is to provide a simplified structure wherein all of the various tackle and equipment required for a fishing trip may be carried in a single unit in a readily available manner. The device may be used as a stool on which the fisherman may sit while fishing from the bank particularly.

A further important object of the invention resides in the means for receiving and retaining in position a minnow bucket so that it will be maintained in an upright position and yet be readily removable from the carrier.

Still other important advantages of the invention reside in the particular construction and the unique combination of elements as presented in the appended claims.

These and further objects and advantages of the invention will become apparent to those versed in the art in the following description of one particular form of the invention as illustrated in the accompanying drawings, in which.

A plurality of legs, herein shown as three in number and identified by the numerals 10, 11, and 12 support a lower floor 17. In the present form of the invention, each of these legs 10, 11, and 12 are channel members with their legs turned inwardly and the webs presented outwardly.

Figure 5:
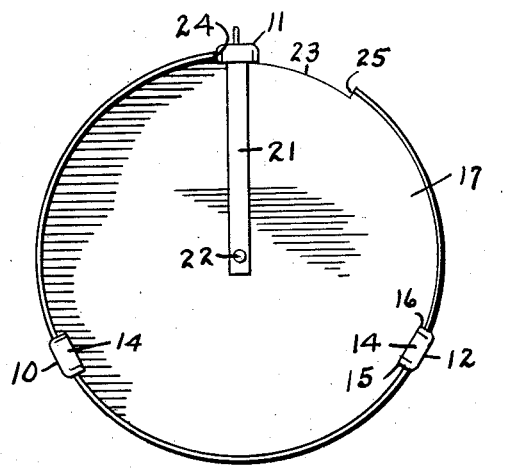
Fig. 5 is a bottom plan view of the carrier.

As indicated in Fig. 5, each of these legs 10, 11, and 12 are preferably provided with foot portions 14 turned inwardly between the legs 15 and 16 to serve as feet of substantial area particularly when the carrier is to be placed on soft ground.

Figure 6:
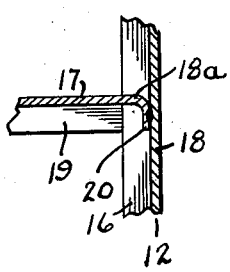
Fig. 6 is a detail in section of the mounting of a lower floor to a supporting leg.

The lower floor 17, Fig. 6, is mounted and secured to the legs 10 and 12 by means of tongue portions 18a entering between the legs 15 and 16 to abut the web 18 of the leg. The floor 17 preferably has a downturned flange 19 therearound for reinforcing purposes particularly, and each of the tongues 18a carries a corresponding short length of the flange 19 designated by the numeral 20, this section 20 abutting the inside of the web 18, and being secured thereto by any suitable means such as by spot welding. The legs 15 and 16 are in effect inserted into the area of the floor 17. The leg 11 is not secured to the floor 17, but is carried on the outer end of a radius bar 21 which is pivotally connected to the center of the floor 17 by any suitable means, such as by a rivet 22.

The floor 17 has the flange 19 cut away throughout an arcuate length designated by the numeral 23 so that abutments 24 and 25 are provided at the respective ends of this arcuate length 23 which in effect is an edge of the floor 17. The leg 11 is free to be shifted throughout the length of this arcuate edge 23 as the bar 21 rocks around the pivot rivet 22, the limit of travel of the leg 11 being the abutments 24 and 25.

Figure 3:
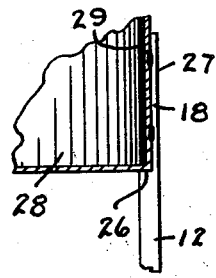
Fig. 3 is a detail in vertical section of the mounting of the tackle box.
Figure 2:
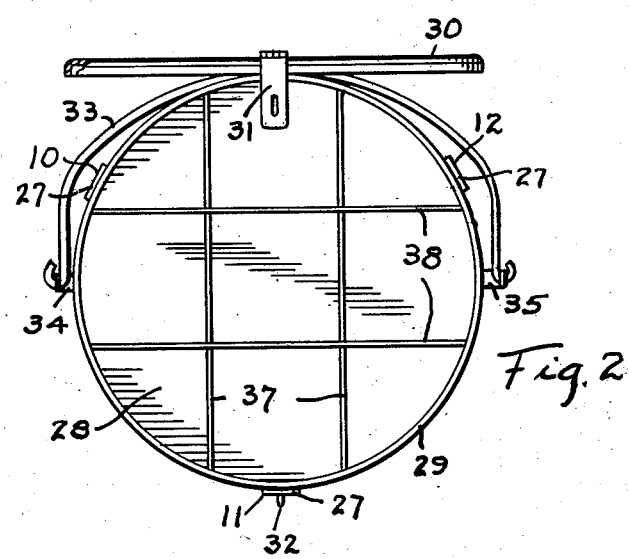
Fig. 2 is a view in top plan with the tackle box lid opened.
Figure 4:
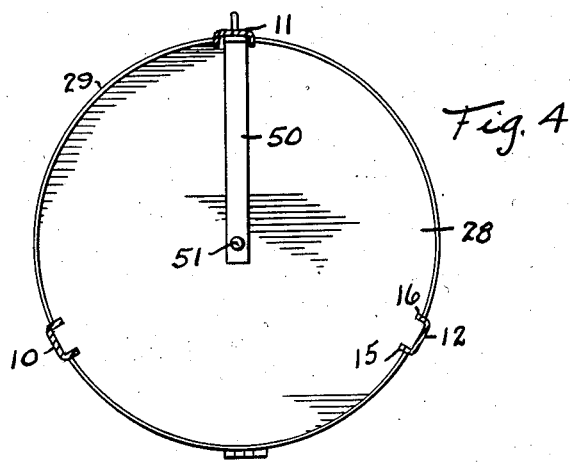
Fig. 4 is a view in transverse section on the line 4—4 in Fig. 1.

The three legs 10, 11, and 12 extend upwardly a distance above the floor 17 and each leg has the web 18 continuing upwardly from a shoulder 26, Fig. 3, provided by cutting away the channel legs thereabove. These extended web portions designated by the numeral 27 receive therebetween a cylindrical tackle box 28 which rests on the shoulders 26 of the legs, to be thus supported at a fixed distance above the floor 17. These web extensions 27 on the legs 10 and 12 only are fixed to the side wall 29 of the tackle box 28 by any suitable means, such as by spot welding. The web 27 of the leg 11 is left free to travel around the tackle box 28 circumferentially.

The leg 11 has secured thereto a bar 50 immediately under the container 28. This bar 50 extends under the container 28 and is pivotally attached centrally thereof by any suitable means such as by a rivet 51. This bar 50 not only tends to support the upper end portion of the leg 11 in substantially sliding contact with the wall 29 of the container 28, but further serves as a support between the leg 11 and the underside of the container.

The tackle box 28 carries a lid 30 hinged to the box 28 and this lid 30 is detachably secured in a closed position by any suitable means, herein shown as by means of a hasp 31 hinged to the lid and dropping down over a staple 32 which is fixed to the upper end of the leg 11. In fact this securing means for the lid 30 is also employed to hold the leg 11 equally spaced circumferentially from the legs 10 and 12.

Where the three legs are employed as in the present disclosure, these legs will be spaced normally 120 degrees apart. Of course any suitable hasp to staple retaining means may be employed such as a padlock or even a short rod or stick. The entire structure thus far described may be picked up and carried about by means of a bale 33 carried by the ears 34 and 35 on the sides of the tackle box 28.

Figure 1:
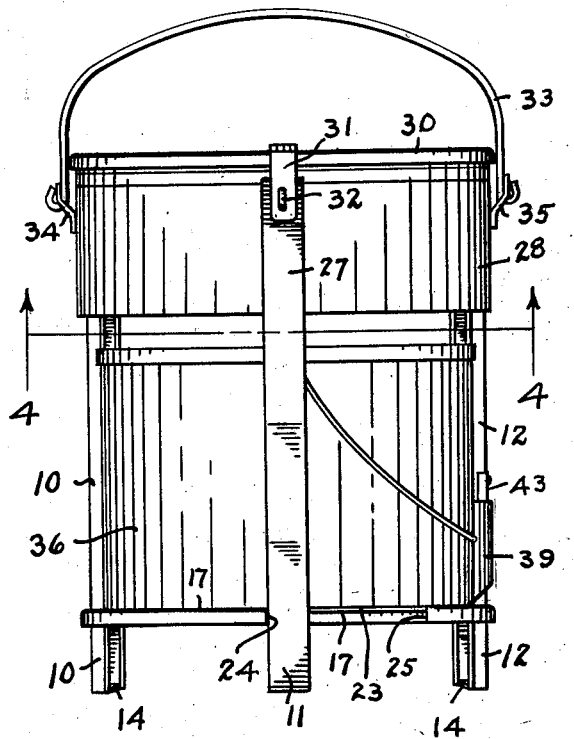
Fig. 1 is a view in side elevation of a structure embodying the invention.

The space over the floor 17 and under the tackle box 28 is designed as to dimensions to receive therebetween a minnow bucket 36. This spacing apart of the legs 10, 11, and 12 being determined by the floor area 17, is such that when the leg 11 is released from engagement by the hasp 31, it may be rocked around to bring it into abutment with either the stops 24 or 25, and then the spacing between that leg 11 and either one of the legs 10 or 12 depending upon which way the leg 11 is shifted will be sufficient to permit the bucket 36 to be entered between those legs and rested on the floor 17, following the placement of the bucket, the leg 11 is then rocked back to have the hasp 31 again engage the leg 11 staple 32 thus securing the minnow bucket 36 within the confines of the three legs resting on the floor 17 and under the tackle box 28 all as indicated in Fig. 1.

The inside of the tackle box 28 obviously may be divided into compartments by partitions 37 and 38 all as may be desired in accordance with the selection of the user.

Figure 7:
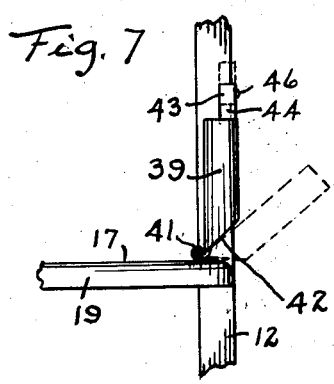
Fig. 7 is a detail in side elevation of a fishing rod holder in a position for carrying.
Figure 8:
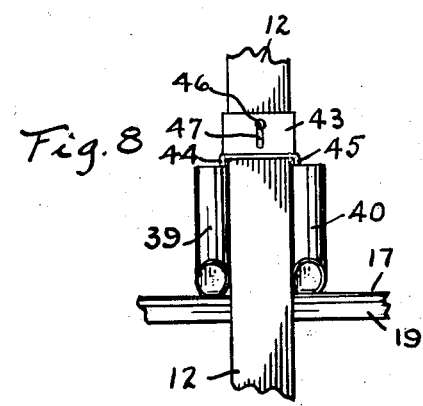
Fig. 8 is a view in front elevation of the fishing rod holder securing means.

The fisherman generally has his hands full at best, and this carrier is intended to relieve that situation even to the carrying of his poles. To carry two poles at least, there are provided adjacent one of the legs, such as the leg 12, two pole carriers 39 and 40 each being a short length of tubing and hinged to the floor 17 by a hinge 41, Fig. 7. As indicated in Figs. 7 and 8, these tubes 39 and 40 are hinged near the outer edge of the floor 17 so that they may be rocked around to the diagonal position as indicated by the dash lines, Fig. 7 and there supported by means of a diagonal end 42 to the tubes resting on the floor 17. The tubes 39 and 40, in the carrying positions, will be held upright in substantial parallelism with the leg 12 by means of a slide member 43 which has two downturned fingers 44 and 45 entering within the tubes 39 and 40 respectively. The slide member 43 in its simplest form as herein shown is held in sliding contact with the outside of the leg 12 by means of a rivet 46 passing through a slot 47 in the member 43 so that the slide member 43 may be raised to allow the tubes 39 and 40 to drop outwardly to the dash lines positions, and when the members 39 and 40 are rocked back to the vertical positions the slide 43 is raised and dropped to have the fingers 44 and 45 enter therein. The members 39 and 40 will as above indicated be in their vertically disposed positions to carry the poles, but when the fisherman is working from the bank of a stream or the like, and wants to set his poles, the tubes 39 and 40 may be dropped to the dash line positions to allow the poles to be inclined outwardly toward the water. The tubes 39 and 40 in any event will be mounted on the floor 17 adjacent one of the fixed legs either the leg 10 or the leg 12.

Obviously other equipment may be hung on the legs 10 and 12 such as bait cans and thermos bottles and the like, but the essential features of my invention are those as have been herein described and illustrated in the accompanying drawings.

Therefore while I have described my invention in the one particular form, it is obvious that structural changes may be employed particularly in the shapes of the legs and other structural details all without departing from the spirit of the invention, and I therefore do not desire to limit my invention to that precise form beyond the limitations which may be imposed by the following claims.

I claim:

1. A carrier comprising a floor; a plurality of legs supporting the floor therebetween and extending thereabove; a container carried by upper portions of said legs spaced above the floor; one of said legs being shiftable along an edge portion of said floor and also along said container, said other legs being fixed relative to said floor; an abutment in the path of said one leg limiting shifting from a normal position midway between the other legs toward an adjacent leg; means on said container interengaging said one leg and releasably maintaining it in said normal position; said leg interengaging means comprising a lid on said container hinged thereto, a hasp carried by the lid, and a hasp engaging staple carried by said one leg.

2. A fisherman's tackle and bait carrier comprising a floor; a pair of spaced apart legs fixed to said floor and extending vertically thereabove; a tackle container, to the side of which, upper portions of said legs are fixed, spacing said container above said floor and leaving an intervening space therebetween; a third leg; means supporting and shiftably interconnecting said third leg with said floor providing travel of the third leg both circumferentially of the floor and of said container; an abutment carried by said floor in the path of said third leg limiting its travel to a normal position approximately midway between said pair of legs; said third leg terminating by its upper end on the side of said container; a cover removably carried in fixed circumferential position over said container; and means detachably interengaging said cover and said third leg retaining said cover closed over the container and said third leg against said circumferential travel.

3. The structure of claim 2 in which said floor is circumferentially notched and said third leg extends across said notch, an end of said notch constituting said abutment, and said third leg supporting means consists of a bar pivotally attached to said floor and fixed to said third leg retaining that leg within said notch.

References Cited in the file of this patent
UNITED STATES PATENTS

| | | |
|---|---|---|
| 1,169,560 | Murray | Jan. 25, 1916 |
| 1,310,830 | Hothersall | July 22, 1919 |
| 1,459,184 | Morton | June 19, 1923 |
| 2,556,631 | Pool | June 12, 1951 |